3,390,005
PHOSPHATE GEL COMPOSITIONS
James P. Hamilton, Pasadena, Md., assignor to FMC Corporation, New York, N.Y., a corporation of Delaware
No Drawing. Filed June 6, 1966, Ser. No. 555,286
3 Claims. (Cl. 106—287)

ABSTRACT OF THE DISCLOSURE

A thixotropic phosphate gel composition suitable for coating dust filter media in air filters, said composition comprises tris(tetrahydrofurfuryl) phosphate, a siliceous bodying agent and a cationic surfactant.

---

This invention relates to novel, bodied, thixothropic phosphate gel compositions suitable for coating dust filter media in air filters, and has particular reference to compositions of this sort which can be washed out with water.

Viscous impingement type industrial air filters contain porous filter media or mats through which air is passed. The filter medium is coated with a stable non-volatile liquid which entraps dust particles as they pass through the filter and prevents them from becoming re-entrained in the air stream. However, loss of this liquid coating during use results in a lowering of the cleaning capacity of the filter. The liquid may be blown off the filter media by the high air velocities encountered, for example, with diesel engine filters. Moreover, when the filter medium is tightly wound around spools, as in the recently developed automatic replacement filters, the liquid coating tends to be squeezed out.

It has been proposed to overcome these difficulties by the use of compositions comprising triaryl phosphates with or without soluble resin dissolved therein, in conjunction with a thickening agent such as pyrogenic silica. More recently, the combination of these materials with a non-ionic or cationic surfactant has been suggested for the coating of air filters with gels, as disclosed in application Ser. No. 314,532, filed Oct. 7, 1963, now Patent No. 3,297,460.

The air filter gels of this application, as well as those heretofore employed, have been essentially useful for the coating of one-time filter mats, the filter medium being thrown away when it has been exhausted. This had made it essential to use rather inexpensive base material for the filter medium. There has been a demand for dust-entrapping impingement filter coatings which could readily be washed out of a filter material with water, so that the makers could afford to use a more expensive, stronger base which could easily be recoated.

It is the principal object of this invention to produce viscous liquids which can readily be spread on filter mats for use in high air speed filters and in automatic-type filters, which are efficient holders of impinging dust, which do not squeeze out of the tightly wound mats, and yet at the same time can readily be washed out with water.

In accordance with this invention, I provide an air filter material with all of these properties, by bodying tris(tetrahydrofurfuryl)phosphate with a siliceous bodying agent and a cationic surfactant. The tris(tetrahydrofurfuryl)phosphate is used in major proportion comprising 90% or more of the composition. The cationic surfactant is used in a range from about 0.1 to 5% by weight of the composition, and the siliceous bodying agent comprises the balance of the product, being present in a range from about ½ to 10% depending on the nature of the agent. When high surface active materials are used, such as pyrogenic silica, having a particle size not greater than 0.025 micron, the useful range is about from ½ to 5%.

A similar range of material is needed with the microcrystalline acid-treated asbestos derivative described and claimed in patent application Ser. No. 436,304 filed Mar. 1, 1965. With siliceous materials of lower surface area and bodying effect, from about 5% to about 10% may be needed.

The compositions are all highly thixotropic, being stable sprayable liquids when exposed to high shear, but setting up rapidly to very viscous to gelled materials at lower rates of shear.

The action of the coating on the filter mat for entrapment of dust particles is believed to be that of "wetting." When a minute layer of dust has been captured by the liquid, the particles become coated by seepage of the liquid through the layer. Thus, in a short time, which may be several seconds to a few minutes, the first layer of dust is completely wetted by the liquid and the liquid is again open to the air-borne dust. In the past, the concentration of thickening agent in the coating was so high that the capacity of the filter to trap dust was sharply decreased. By the practice of this invention, our compositions, although their viscosity is very high, have sufficient wetting capacity to seep through and wet the dust already entrapped and are thereby able to capture further amounts of dust particles. In other words, the compositions are viscous enough to remain on the filter mats, yet the capacity of the liquid to trap dust is not significantly reduced.

The degree of physical dispersion of the silica and surface active agent in the organic phosphate affects the liquid viscosity. The viscosities will tend to be somewhat higher with a high-speed blender than with an ordinary stirrer. Ball mills or roller mills may also be used to prepare satisfactory dispersions. Elevated temperatures during the dispersion step should be avoided, since heat will adversely affect gelation. I normally perform the mixing operation at room temperature.

The silica used in preparing the high-viscosity compositions of this invention is preferably of the type known as "pyrogenic silica." It is prepared by reacting almost pure silicon tetrachloride and water in a vapor phase to produce silicon dioxide and hydrogen chloride. The silica so produced is a very pure powder, of the order of 99% pure, having a particle size not greater than about 0.025 micron. Pyrogenic silicas having particle sizes as small as about 0.007 micron are presently available. Preferably, the pyrogenic silica has a particle size of about 0.015 to 0.020 micron. It is useful in the range of ½ to 5% of the compositions of this invention, most preferably 1.5 to 3%.

A second preferred type of siliceous bonding agent can be prepared, in accordance with United States application Ser. No. 436,304, filed Mar. 1, 1965, by treating chrystodile asbestos with an acid to increase the ratio of $SiO_2$ to $MgO$ in the product from an original 1 to 1 weight ratio, to a ratio in the range of 1.06 to 1.30 $SiO_2$ to 1.00 $MgO$ by weight, followed by mechanical disintegration so that at least 10 to 15% by weight of the product is in the submicron size range in all dimensions. This product is useful in about the same percentage ranges as pyrogenic silica.

Silica aerogels can also be used to provide the bodying effect, but are less efficient, generally requiring 3 to 10% to produce the desired bodying effect. These silicas have particle sizes in the range of a few tenths of a micron to a few microns.

Strangely enough, non-ionic and anionic surfactants are useless in the practice of this invention, but cationic surfactants alone are useful in order to get the desired results. Typical products include long chain alkyl trimethyl ammonium chloride, dialkyl dimethyl ammonium chloride, octadecenyl trimethyl ammonium chloride, tetraethyl ammonium bromide, dialkyl dimethyl ammonium bromide, alkyl dimethyl 3,4-dichlorobenzyl ammonium chloride, stearyl dimethyl benzyl ammonium chloride, and octadecyl dimethyl ethyl ammonium bromide.

The following examples are given by way of illustration and not by way of limitation of this invention. All amounts and percentages are by weight. In each case, the silica thickener was mixed with the tris(tetrahydrofurfuryl) phosphate and the surfactant used by means of a laboratory stirrer at 2000 r.p.m. for two minutes. All viscosities are measured on a Brookfield Model LVF viscometer with a No. 4 spindle at 25° C., at the indicated speed.

EXAMPLE A 97.5 parts of tris(tetrahydrofurfuryl)phosphate and 2.5 parts of pyrogenic silica (Cabosil M5) were mixed with a laboratory stirrer for 2 minutes at 2000 r.p.m. A liquid dispersion resulted which showed only mildly thixotropic properties. Increase of the silica to 3% made no appreciable change.

Viscosity

| R.p.m. | Cps. |
|---|---|
| 6 | 280 |
| 60 | 180 |

EXAMPLE B 97.5 parts of tris(tetrahydrofurfuryl)phosphate were mixed as in Example A with 2½ parts by weight of the same pyrogenic silica, and 2½ parts by weight of polyoxyethylene sorbitan monoleate, a non-ionic surfactant. The product was too thin to use as an air filter gel.

Viscosity

| R.p.m. | Cps. |
|---|---|
| 6 | 500 |
| 60 | 210 |

EXAMPLE C 97 parts by weight of tris(tetrahydrofurfuryl)phosphate were mixed as in Example A with three parts by weight of the same pyrogenic silica and one part by weight of sodium n-methyl n-oleyl taurate, again without satisfactory gel formation.

Viscosity

| R.p.m. | Cps. |
|---|---|
| 6 | 500 |
| 60 | 250 |

EXAMPLE D

Several additional surfactants were tried in the formulation of Example C, including fatty alcohol Na sulfate, Na lauryl sulfate, alkyl benzene sodium sulfonate, and sodium isopropyl naphthalene sulfonate, without forming a satisfactory coating gel.

EXAMPLE 1–8

When the tris(tetrahydrofurfuryl)phosphate was combined with the pyrogenic silica and a cationic surfactant in the proportions indicated in Table I, in the same fashion as in Examples A to D, gels were obtained in each case in which the ratio of viscosity at 6 r.p.m. to that of 60 r.p.m. ranged frim 4.3 to 6.4, indicating a high degree of pseudoplasticity.

| Example | Formulations | | | | | | | |
|---|---|---|---|---|---|---|---|---|
| | 1 | 2 | 3 | 4 | 5 | 6 | 7 | 8 |
| THFP | 97 | 97 | 97 | 97 | 97.5 | 98.5 | 98.5 | 97 |
| Pyrogenic Silica | 3 | 3 | 3 | 3 | 1.5 | 1.5 | 1.5 | 3 |
| Surfactants: | | | | | | | | |
| Arquad 2C | 0.5 | 1 | 2 | 3 | 1 | 2 | 3 | |
| Arquad C50 | | | | | | | | 1 |
| Viscosity (cps.): | | | | | | | | |
| 6 r.p.m. | 8,000 | 15,000 | 36,000 | 57,500 | 2,800 | 7,000 | 20,000 | 22,500 |
| 60 r.p.m. | 1,600 | 4,100 | 6,000 | 9,000 | 650 | 1,450 | 3,000 | 3,900 |
| Pseudoplastic ratio (6 r.p.m./60 r.p.m.) | 5.1 | 6.1 | 6.0 | 6.4 | 4.3 | 4.7 | 6.7 | 5.8 |

Arquad 2C = Long chain dialkyl dimethyl ammonium chloride.
Arquad C50 = Octadecenyl trimethyl ammonium chloride.

The comparison of Examples 1 to 8 with Examples A to D indicaes the unique effect of cationic surfactants in inducing a high degree of pseudoplasticity in combinations of pyrogenic silica and tris(tetrahydrofurfuryl)phosphate.

EXAMPLES 9 AND 10, AND E FOR COMPARISON

Examples 1 to 8 were repeated, using the formulations indicated in the table. The microcrystalline colloidal asbestos was prepared by treating opened up asbestos at 10% solids in 0.2 N HCl for 2 hours at reflux, until the $SiO_2/MgO$ weight ratio was 1.21 to 1.0. The material was drained, washed free of acid with water, and disintegrated in a Waring blender until 20% by weight was submicron in size.

TABLE II

| Example | E | 9 | 10 |
|---|---|---|---|
| THFP | 99.5 | 99.5 | 98.5 |
| Treated Asbestos | 0.5 | 0.5 | 1.5 |
| Arquad C50 | | 1.0 | 1.0 |
| Viscosity (cps.): | | | |
| 6 r.p.m. | 1,000 | 2,000 | 8,500 |
| 60 r.p.m. | 400 | 555 | 2,100 |
| Pseudoplastic ratio (6 r.p.m./60 r.p.m.) | 2.5 | 3.6 | 4.0 |

EXAMPLES 11, 12, AND 13, AND F AND G FOR COMPARISON

Formulations were made up in the same manner as in the other examples, using two silica aerogels. Formulations and results are shown in the table:

TABLE III

| Example | F | 11 | G | 12 | 13 |
|---|---|---|---|---|---|
| THFP | 94 | 94 | 97 | 97 | 94 |
| Silica Aerogel, 0.5–3 micron size | | | 3 | 3 | 6 |
| Silica Aerogel, 3–5 micron size | 6 | 6 | | | |
| Arquad C50 | | 1 | | 1.0 | 1.0 |
| Viscosity (cps.): | | | | | |
| 6 r.p.m. | 500 | 11,800 | 500 | 1,700 | 6,500 |
| 60 r.p.m. | 300 | 2,100 | 200 | 350 | 1,250 |
| Pseudoplastic ratio (6 r.p.m./60 r.p.m.) | 1.67 | 5.6 | 2.5 | 4.9 | 5.2 |

Note the increase in pseudoplastic ratio with the addition of the cationic surfactant.

All of the numbered examples, i.e. the examples of this invention, sprayed readily into air filter mats, and set up to give gels which gave excellent dust control. Moreover, they could be easily flushed out with water.

Obviously the various modifications of the proportions and ingredients may be made without departing from the scope of the invention which is defined in the claims.

I claim:

1. A water-soluble highly viscous coating composition for viscous impingement filters which comprises as its major component at least 90% of tris(tetrahydrofurfuryl) phosphate, from 0.5 to 10% of a siliceous bodying agent, and from 0.1 to 5% of a cationic surfactant, the composition being distinguished by its highly pseudoplastic character.

2. The coating composition of claim 1 in which the bodying agent is a pyrogenic silica having a particle size below 0.025 micron, present in a range from 0.5 to 5%.

3. The coating composition of claim 1 in which the bodying agent is a microcrystalline acid leached asbestos in which the weight ratio of $SiO_2$ to MgO is in the range of 1.06–1.30 to 1.0, present in the range of 0.5 to 5%.

References Cited

UNITED STATES PATENTS

| | | | |
|---|---|---|---|
| 3,016,304 | 1/1962 | Preston | 106—287 |
| 3,120,545 | 2/1964 | Phillips | 260—347.8 |
| 3,297,460 | 1/1967 | Rau | 106—177 |

JAMES A. SEIDLECK, *Primary Examiner.*

T. MORRIS, *Assistant Examiner.*

UNITED STATES PATENT OFFICE
CERTIFICATE OF CORRECTION

Patent No. 3,390,005                          June 25, 1968

James P. Hamilton

It is certified that error appears in the above identified patent and that said Letters Patent are hereby corrected as shown below:

Columns 3 and 4, TABLE I, third column, line 5 thereof, "15,000" should read -- 25,000 --; same table, fifth column, line 2 thereof, insert -- 3 --. Column 4, line 34, "indicaes" should read -- indicates --; TABLE II, third column, line 5 thereof, "555" should read -- 550 --.

Signed and sealed this 10th day of February 1970.

(SEAL)

Attest:

Edward M. Fletcher, Jr.                        WILLIAM E. SCHUYLER, JR.

Attesting Officer                                Commissioner of Patents